Oct. 8, 1957     D. M. BUETER     2,809,347
GUN CIRCUIT TESTER
Filed Dec. 24, 1956     2 Sheets-Sheet 1
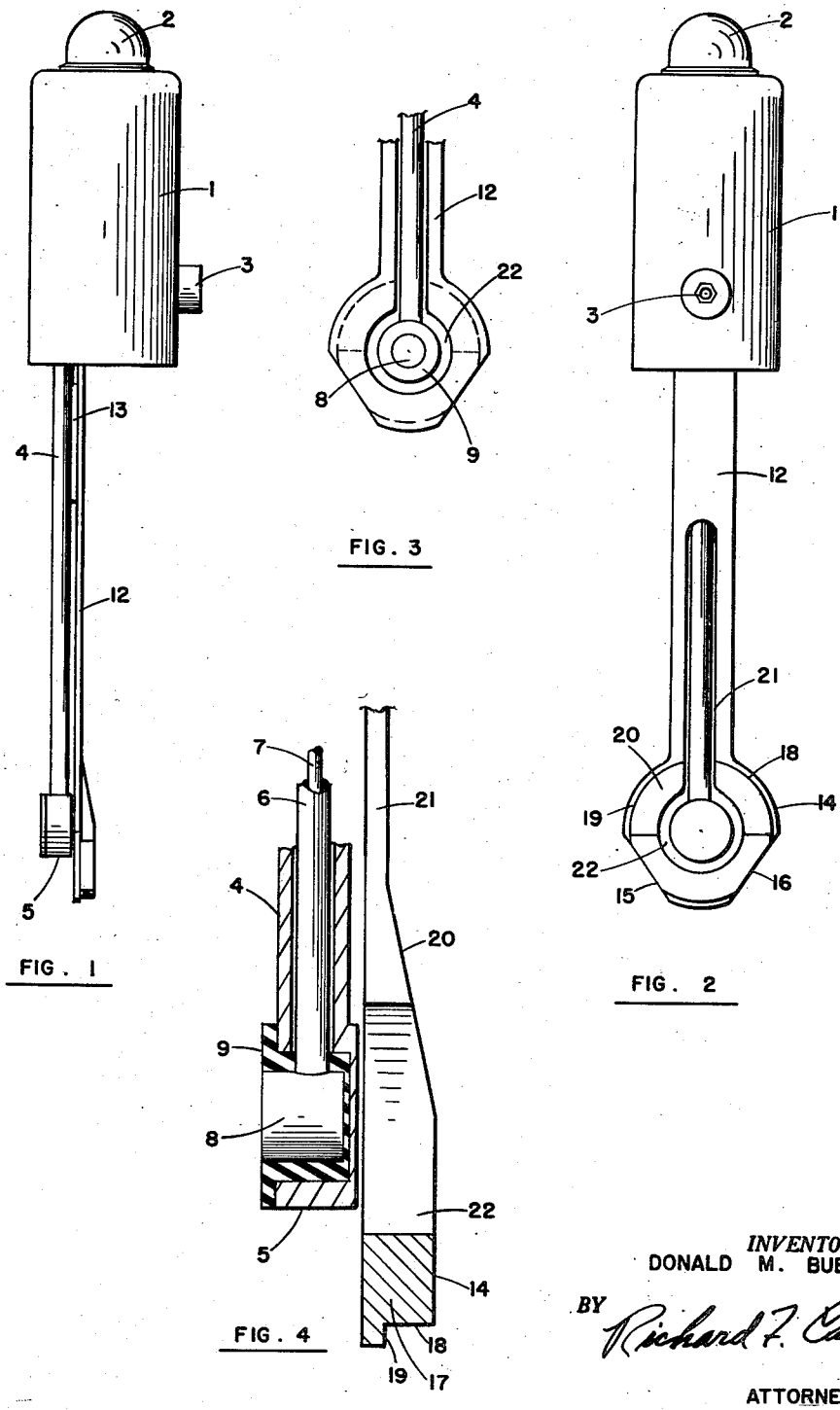
INVENTOR.
DONALD M. BUETER
BY Richard F. Carr
ATTORNEY Oct. 8, 1957  D. M. BUETER  2,809,347
GUN CIRCUIT TESTER
Filed Dec. 24, 1956  2 Sheets-Sheet 2
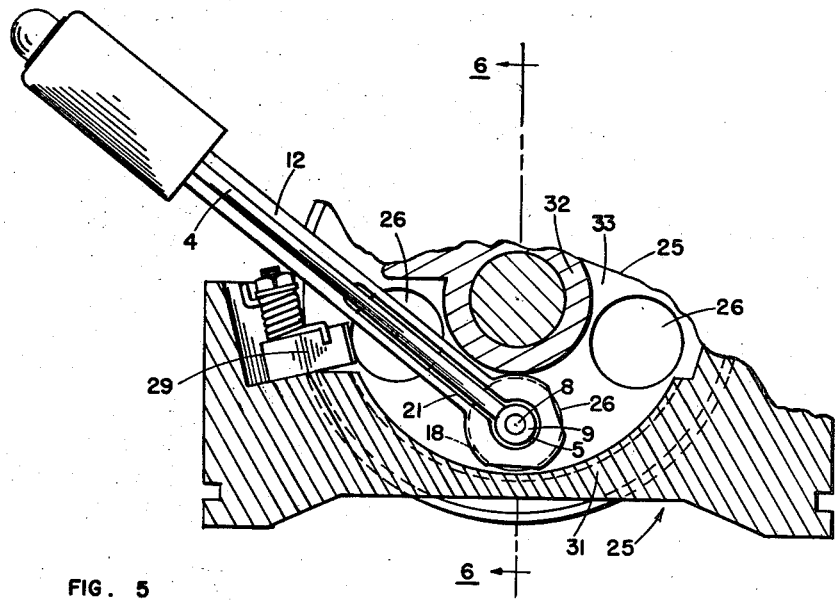
FIG. 5
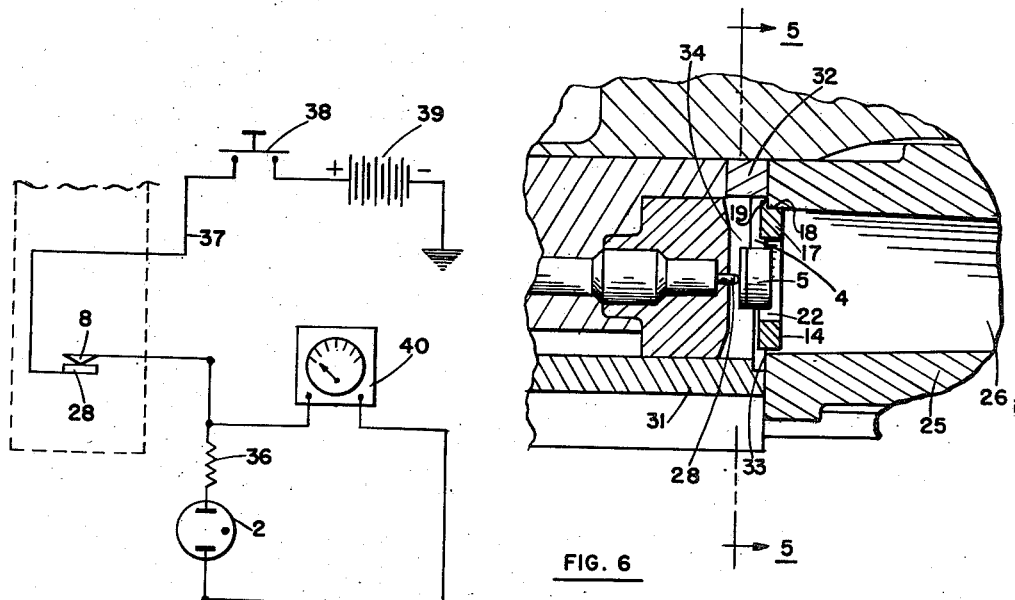
FIG. 6
FIG. 7
INVENTOR.
DONALD M. BUETER
BY *Richard F. Carr*
ATTORNEY

United States Patent Office 2,809,347
Patented Oct. 8, 1957

2,809,347

GUN CIRCUIT TESTER

Donald M. Bueter, Hawthorne, Calif., assignor to North American Aviation, Inc.

Application December 24, 1956, Serial No. 630,202

7 Claims. (Cl. 324—51)

This invention pertains to a gun circuit tester and more particularly to a device testing the circuit for a gun provided with a rotary cartridge-receiving drum closely spaced from a firing pin and fixed structure.

It is necessary at frequent intervals to check the circuit to the firing pin of an automatic gun to assure that the gun is in condition for operation. It is well known in the art that a contact may be made with the firing pin of the gun connecting to a suitable electrical indicating means to provide an indication when the circuit to the firing pin is intact. The real problem with this type of gun testing is in the difficulty of making contact with the firing pin after the gun has been fully assembled, and also after installation in such a location as the gun bays of an aircraft. In the prior art such testing was frequently accomplished by inserting a contact device down the barrel of a gun to engage the firing pin. This at best is an awkward solution of the problem. In one instance for a production military aircraft it was necessary to employ a rod 88 inches long for insertion in the gun barrel to contact the firing pin. This obviously unwieldy device was difficult to transport and handle, and relatively expensive to make and maintain. Furthermore there was no certainty with this type of device when contact had actually been made with the firing pin.

Accordingly it is an object of this invention to provide a compact easily manipulated gun circuit tester. Another object of this invention is to provide a tester usable on a gun which has been fully assembled and installed for use. A further object of this invention is to provide a gun circuit tester of simple and economical construction. Yet another object of this invention is to provide a gun circuit tester providing an improved and more positive contact with the firing pin. These and other objects will become apparent from the following detailed description taken in connection with the accompanying drawings in which:

Fig. 1 is a side elevational view of the tester of this invention;

Fig. 2 is an end elevational view of the arrangement of Fig. 1;

Fig. 3 is a fragmentary view of the end of the tester taken from the side opposite that of Fig. 2;

Fig. 4 is an enlarged fragmentary sectional view showing the indexing means and the contact;

Fig. 5 is a sectional view illustrating use of the tester with a gun;

Fig. 6 is a sectional view taken along line 6—6 of Fig. 5; and

Fig. 7 is a wiring diagram of the gun tester circuit.

As illustrated in the drawing, and with particular reference to Figs. 1 through 4, the circuit tester of this invention includes a housing 1 provided with an indicating light 2 and a jack 3, the operation and purpose of which will be made more clear hereinafter. Extending from the housing is a first projecting member 4 which is in the form of a relatively short hollow tube. This member terminates at its outer end in an enlarged portion 5 which provides a contact means for the tester. To that end, within tubular member 4 is an insulated wire 6 having a central conductor 7 which connects to a contact member 8. The contact is insulated as at 9 from the remainder of the tester structure.

Additionally extending from the housing is a second projecting member 12, the purpose of which is to index the testing device and maintain the contact in firm engagement with the firing pin of the gun being tested. Therefore this is a flat resilient member in the nature of a leaf spring. It extends parallel to member 4 and at its inner end may be soldered or brazed to that member as indicated at 13.

Member 12 terminates at its outer end in a rounded portion 14 having flattened sections 15 and 16 for clearance purposes. End 14 includes a central axially projecting portion 17 which defines shoulder 18 and flange 19. Shoulder 18 is dimensioned to fit within a cartridge-receiving chamber in the drum of a gun to be tested. Inner surface 20 of end 14 of member 12 is beveled as indicated to permit ready use and removal of the tester.

In addition, the end portion of member 12 is provided with a slot having an elongated portion 21 and a circular portion 22. This slot is designed to freely receive member 4 and contact 5 upon deflection of member 12.

The use of the tester of this invention may be seen by referenced Figs. 5 and 6. Here the tester is illustrated associated with a gun 24 having a rotatable drum 25 provided with a plurality of axially extending cartridge-receiving chambers 26. The ammunition feeding mechanism of the gun will insert the cartridges into chambers as the drum rotates. After being fully rammed home the cartridge will be fired by an electrical impulse at firing pin 28. An ejector 29 is also included with the gun mechanism and used to eject the cases of the ammunition after firing.

It may be observed that fixed structure 31 and 32 of the gun is disposed immediately adjacent rear face 33 of the drum leaving only a narrow annular passage 34 between the fixed and movable portions thereof. This passageway receives the end portions of the cartridges as they rotate around with the drum. Firing pin 28 is located so that it projects into passageway 34 and is in alignment with a chamber 26 when the same is in turn in alignment with the gun barrel for firing of the cartridge.

The gun tester of this invention is designed so that it will fit within the narrow annular passage 34 above fixed portions 31 of the gun and beneath fixed portions 32. As the tester is inserted into this narrow opening spring member 12 is deflected so that projecting member 4 and contact portion 5 are received within the slots 21 and 22 in member 12. This permits movement of the tester to the position of Figs. 5 and 6 where it is in alignment with the firing pin and with an opening 26. When this occurs end portion 14 of member 12 automatically indexes and aligns the tester in the proper position so that contact 8 may engage the firing pin. Thus shoulder 18 of axially projecting portion 17 is received within aperture 26 while flange 19 engages the rear face 33 of the drum of the gun. This centers and aligns the tester with respect to opening 26. At the same time the spring force exerted by member 12 maintains contact 8 in firm engagement with firing pin 28 and assures that an electrical circuit will be made with the firing pin. Therefore, despite the limited space available on guns of this type it is possible to use a compact relatively short testing device which is automatically indexed and which provides positive contact with the firing pin. The necessity of extending a tester axially down the gun barrel is entirely eliminated.

With the tester in the position illustrated in Figs. 5 and 6 the gun circuit may be very simply tested by depression of the trigger button in the pilot's compartment which will light indicator 2 if the circuit is intact. The wiring arrangement by which this occurs may be seen in Fig. 7. Indicator light 2 connects on one side to ground and at the other connects through a resistor 36 to contact 8. The latter is in engagement with firing pin 28 which through conductor 37 extends to trigger switch 38 in the pilot's compartment of the aircraft. A source of electrical power such as battery 39 completes the circuit. If desired in addition to the indicator light 2 there may be provided an ammeter 40 connected to jack 3 to give a dial reading of the current flow in the gun circuit.

The foregoing detailed description is to be understood as given by way of illustration and example, the spirit and scope of this invention being limited only by the appended claims.

I claim:

1. A gun circuit tester comprising an elongated structure for association with an assembled gun adjacent the firing pin thereof, said structure including electrical circuit indicating means on one end thereof, and contact means on the other end thereof, said structure including indexing means for engagement with portions of a gun to position said contact in firm contacting engagement with the firing pin of such a gun.

2. A gun circuit tester comprising a housing, a first projecting member extending therefrom, said first projecting member having a hollow construction and including contact means on the outer end thereof, a second projecting member extending from said housing in substantial parallelism with said first projecting member, said second projecting member being in the form of a deflectable leaf spring, said second projecting member including index means at the outer end thereof for engagement with the drum of a gun with which said tester is associated for positioning said contact means at a firing pin of such a gun while said second projecting member is deflected to exert a force maintaining said contact means in firm engagement with said firing pin for testing of the circuit of said gun.

3. A gun circuit tester comprising a housing, a first projecting member extending therefrom, said first projecting member including a contact at the outer end thereof, a second projecting member extending from said housing, said second projecting member being of resilient deflectable construction and including index means on the outer end thereof for positioning said projecting members between a cartridge-receiving aperture and a firing pin of a gun with which said tester is associated, and aligning said contact with such a firing pin with said second projecting member deflected for maintaining said contact in firm engagement with such firing pin, said housing including electrical circuit indicating means connected with said contact for indicating an electrical circuit to the firing pin of such a gun.

4. In combination with a gun having a rotatable drum provided with axially extending cartridge-receiving apertures therein, and a firing pin in fixed structural portions closely spaced from the rear face of said drum, a gun circuit tester comprising a housing, a rigid projecting member extending from said housing, said projecting member including a contact at the outer end thereof, a resilient projecting member extending from said housing in substantial parallelism with said rigid projecting member, said resilient projecting member including index means for engagement with said drum at said rear face within a cartridge-receiving aperture for aligning said contact with said fiiring pin, said projecting members being dimensioned with respect to said fixed portions and said drum for causing said resilient member to be deflected when so associated with said drum for thereby maintaining said contact in firm engagement with said firing pin.

5. A device as recited in claim 4 in which said index means includes an axially extending portion dimensioned to fit within said cartridge-receiving aperture, and a flange around said axially extending portion for engaging the rear face of said drum.

6. A device as recited in claim 4 in which said resilient projecting member includes slot means remote from said housing dimensioned to receive said first projecting member when said members are so associated with said gun and said resilient member is caused to deflect.

7. In combination with a gun having a rotatable drum means provided with cartridge-receiving apertures therein, and a firing pin closely spaced from said drum means, a gun circuit tester comprising a support member, contact means on one end of said support member, conductor means extending through said support member, electrical indicating means on the other end of said support member for indicating a completed electric circuit, a spring member substantially in parallelism with said support member, said spring member being attached to said support member remote from said contact means, said spring member having indexing means for engagement with said drum means at a cartridge-receiving aperture therein for thereby positioning said contact means at said firing pin, said spring member including slot means therein dimensioned to receive said support member and said contact means when said tester is so associated with a gun for thereby exterting a spring force maintaining said contact means in firm engagement with said firing pin.

References Cited in the file of this patent

UNITED STATES PATENTS

| | | |
|---|---|---|
| 2,305,601 | Brown | Dec. 22, 1942 |
| 2,639,318 | Des Roches | May 19, 1953 |